Sept. 25, 1962     D. E. STEARNS     3,056,088
ELECTRIC PULSE GENERATOR AND CONTROL THEREFOR
Original Filed Aug. 18, 1954     2 Sheets-Sheet 1

DICK ELZA STEARNS
*INVENTOR.*

United States Patent Office 3,056,088
Patented Sept. 25, 1962

3,056,088
ELECTRIC PULSE GENERATOR AND
CONTROL THEREFOR
Dick Elza Stearns, P.O. Box 1234, Shreveport, La.
Continuation of application Ser. No. 450,573, Aug. 18,
1954. This application May 22, 1961, Ser. No. 111,861
18 Claims. (Cl. 328—68)

This invention relates to improvements in voltage-fed pulse generator circuits for use to produce pulses of relatively short duration, and refers more particularly to such circuit which uses a controlled electronic switching means having the control and conducting characteristics of a gas filled tube in a manner to minimize the loss of energy in the load and the generator circuit, where the load being served is substantially reactive. These circuits have particular utility in the high voltage inspection of insulating coatings to detect flaws or defects commonly known as "holidays," and the improved circuit is especially valuable in this use because of the well regulated output voltage obtainable under varying conditions of the coating.

This application is a continuation of my copending application Serial Number 450,573, filed August 18, 1954, now abandoned, which in turn is a continuation-in-part of my prior copending application Serial Number 378,359, filed September 3, 1953, now abandoned.

In the inspection of insulating coatings, as for example of the type applied to cross-country pipelines for transporting gases and fluids, the object is to detect any actual flaw or break in the coating as well as any thin place, such as might be occasioned by the presence of a bubble or other imperfection, to insure an unbroken coating of suitable thickness on the pipe in order to protect the pipe from the corrosive action of the soil and ground fluids. An electric testing potential, commonly from 10,000 to 15,000 volts, is applied across the insulation by an exploring electrode as, for example, the type shown in the United States Letters Patent Number 2,558,883. The electrode, the pipe, and the insulating material therebetween, provide in effect a capacitive load. The capacitance of the load will, of course, vary with the size of the pipe encountered and, even for an individual pipe size, the capacitance will vary from time to time dependent to a large extent on the thickness of the coating, its moisture content, and the presence of surface moisture. Other electrical factors, which are dependent on the conditions at the location of test, must be considered, such as the manner of grounding the pipe to the inspection instrument, and the electrical conductivity of the coating adjacent the point of inspection.

These considerations of the capacitance of the load, the ground resistance, and the surface conductivity of the coating, are so variable, even on some occasions at the same time of day, dependent upon whether the inspection is in the shade or in the sun, that it is impracticable to provide an instrument with adjustments so that the magnitude of the test potential can be changed from time to time, and it is therefore desirable to provide a generating unit which is capable of delivering a well regulated test pulse wherein the voltage regulation is built into, or is inherent in, the instrument so as to be self-compensating. Accordingly, it is one object of the invention to provide a pulse generator with a well regulated voltage output wherein the regulation is inherent to the operation of the generator, eliminating the need for manual adjustments during use.

Bearing in mind that the object of the holiday inspection is to determine that there are no coating interruptions, or spots in the coating which are too thin, it is obvious that the application of the electric test potential should be such as to minimize the amount of energy which is dissipated at or through the coating. With some equipment, such as for example, producing 60 cycle alternating current potentials for testing, coatings are deleteriously affected by the excessive amount of the energy dissipated at or through the coating. This almost constant subjection of the coating to appreciable potential results in the flow of appreciable current through the coating. One of the results of the dissipation of large quantities of energy in such practice is the creation of heat within the coating which produces undesirable effects. It may, for example, soften the coating, thereby allowing it to be pressed too thin and thereupon electrically ruptured by the test voltage. Such practice may also cause carbonization of coating of normal physical thickness so that the test potential breaks down the coating and indicates a holiday where none actually existed prior to the test. In either case, holidays may be indicated in good coatings which have been properly applied. In other words, such equipment, in applying substantially continuous electrical stress, creates holidays. Accordingly, it is one of the objects of this invention to provide a pulse generator of high energy storage level, employing short duration pulses at a suitable repetition frequency and properly regulated output voltage so as to fully examine the insulating material being tested as the exploring electrode is moved therealong, in which only a small portion of the available stored energy is dissipated during each testing pulse.

In the application of a testing potential, or voltage pulse, across the insulating coating on a pipeline by use of an exploring electrode, a band of ionization of appreciable width is created at the surface of the coating around the periphery of the coated pipe under the electrode, at the time of application of the testing pulse, thus subjecting the coating under such ionized band to the potential of the voltage pulse. It is therefore necessary, in the interest of thorough coating inspection along a pipeline, to generate the testing pulses, i.e., cause them to recur, at a rate rapidly enough so as to have entirely traversed the coated surface with successive overlapping circumferential bands of ionization as the exploring electrode is moved along the coated pipe.

Frequently the field inspection of coated metallic objects is conducted at times when the coating, or at least the surface or covering, contains considerable moisture so that there is a tendency for the test voltage to unduly spread over the coating and, as a result, not only increase the capacitive load, but also dissipate energy to no useful purpose, instead of building up the full test potential across the coating. As discussed above, this consideration dictates the employment of a relatively short duration test pulse so that the time of the test potential is sufficiently short as to minimize the leakage energy. On the other hand, if the tests are to take place using the earth as part of the grounding circuit under dry conditions, both of the ground and the coating, a somewhat longer pulse duration has some actual advantage in that it reduces the deleterious effect of high contact resistance between the ground trail and the relatively dry and therefore high resistance earth, pavement, or the like, as the inspection proceeds. It has been found that a high voltage testing pulse having a wave-front buildup time of the order of 50 to 100 micro-seconds, as measured from zero to peak potential, will result in acceptable performance under the normally encountered range of field conditions.

Pulse generators which are commonly in use for holiday inspection generate testing potentials in the form of a repetitive series of damped wave trains, the repetition rate of the wave train groups being of the order of thirty per second. It will be appreciated that the first pulse of each wave train is the true testing pulse, inasmuch as if the insulating coating withstands the voltage of the original pulse at a given locale without failure of the coating, an adequate test has thus been applied. Since only the first pulse of each wave train is required for inspection, the series of lesser pulses which follow in each wave train are of no useful consequence in inspection but merely represent potentially damaging power losses. These losses also compel the use of a larger and heavier primary power source than would be required for an efficient generator of single pulses. The weight and size of the primary power source, usually a battery, is an important consideration because the inspection equipment is usually of a portable nature in that it must be transported in some manner by workmen along the pipeline on which the coating to be tested is applied. An efficient generator of single pulses, requiring relatively less current from a primary source of power, would make possible, for example, the use of a lighter weight battery or result in more uniform self voltage regulation of a battery of given size over longer operational periods between renewals or recharges. A reduction in power requirement would have the further advantage of making possible an appreciable and important reduction in size and weight of the pulse generating equipment itself.

The damped wave train, discussed heretofore, is the result of the uncontrollable bidirectional switching means employed. For example, one common pulse generating system discharges a storage condenser, initially charged to an intermediate high voltage, into the primary of a voltage step-up pulse transformer by means of a mechanical switching contactor in series connection therewith, constituting a bidirectional switch which permits current flow in either direction when closed. When the switch is actuated to discharge the energy of the condenser into the transformer primary, current flow results and a voltage is built up in the capacitive load of the transformer secondary. Upon reaching a peak voltage, the capacitance of the secondary discharges back through the transformer into the storage condenser, a single pulse having been formed and the storage condenser having recovered a substantial portion of its original energy. This action takes place in a period of time far short of the practical possibilities of predetermined time control of a mechanical device and is, therefore, immediately followed by the potentially damaging re-discharge of the storage condenser. Thus, in this mode of operation, the total energy of the storage condenser is employed to achieve the formation of a testing pulse, and although only a small part of the energy is given up during such period, the major portion becomes thereafter unavoidably dissipated through inability to open the mechanical switch at the instant that the first pulse is completed.

It is therefore desirable to control the action of the switching means used to connect the storage condenser across the primary of the step-up transformer so that the switching means cannot again allow discharge at the instant of recovery of energy by the storage condenser upon termination of the first pulse thus making it necessary only to provide a make-up charge for the storage condenser rather than finding it necessary to completely recharge the storage condenser. The disclosures herein teach a system whereby the above-described switching control is made possible as a practical and usable reality through the use of switching means utilizing the characteristics of a novel arrangement of certain gas-filled tubes heretofore thought to be inoperable for this service, because of the inherently long deionization time required by these tubes, as compared to the desired decay time for the pulse. In the application of this control to practice, a voltage-fed pulse generator circuit is used to generate high voltage pulses singly by switching a storage condenser charged to an intermediate high voltage, into the primary of a step-up transformer, to the secondary of which the inspection circuit is connected so as to impress the high voltage pulse across the insulating coating on the exterior surface of the pipeline or other insulated object. This load is substantially capacitive and thus as soon as the voltage of the pulse has reached a crest value, assuming no breakdown has occurred to indicate a defect or holiday, the capacitance of the secondary load discharges back through the transformer. In the disclosures herein, means are shown for periodically generating single high voltage pulses for application to useful employment whereby a substantial portion of the starting energy of the storage condenser is recovered and retained at the end of each single pulse. This results in a substantial reduction of the order of 70 percent in power requirements from the basic power supply, as compared to a damped wave train generator having an equivalent initial testing pulse and repetition rate, thus eliminating a major portion of energy dissipation in the coating and generating equipment and thereby minimizing possible damage to either. Included in the illustrated means to accomplish this reduction in over-all power requirement is the novel method to accelerate deionization of a gas-filled grid controlled switch tube without which the short duration single pulse could not be accomplished.

The disclosures herein of the novel method of accelerating deionization of gas-filled tubes will be found of further value in application to voltage-fed pulse generator systems which use a gas-filled switch tube, where the useful load being served is substantially resistive, and where the total energy of the storage condenser is intentionally discharged completely for the propagation of each pulse, as in circuitry producing pulses of very short duration, such as in periodic single pulse technique used in radar wherein, by the employment of said disclosures, the pulse repetition frequency of a given gas switching tube can be substantially increased, by accelerating the deionization rate of the tube in accordance with this invention.

An object of this invention is to provide a pulse generator for use in holiday detectors under varying conditions of operations.

Another object of this invention is to provide a pulse generator of high operational efficiency and light weight so as to make possible the maximum of ease and flexibility in field handling of the equipment, and at the same time to improve the inspection from the standpoint of the electrical considerations.

Another object is to provide a pulse generator for use with a variable capacity load in which the output voltage is well regulated.

Another object is to provide in a pulser, wherein a condenser discharges into a transformer, a means for cutting off the oscillation at the end of a single pulse in order to minimize the dissipation of energy in the load and test equipment.

Another object is to provide in combination with a circuit a means for isolating usable energy in a capacitor in instantaneous response to flow of current in the circuit where the usable energy is derived from the current flow itself.

Another object is to provide a self-excited pulser for use with a capacitive load wherein a condenser discharges through the primary of a transformer, and the discharge circuit is broken on completion of the first pulse, wherein a gas tube is used to control the pulser.

Another object is to provide a means for accelerating deionization of a gas tube switch in a pulser, responsive to current flow in the plate circuit of the tube itself.

Another object is to provide a storage condenser discharge pulser wherein a gas tube is included as a timing switch, with means instantly responsive to the breakdown of the gas tube timing switch, said means to accelerate deionization of the tube upon cessation of current flow therethrough, by utilization of a fractional amount of energy derived from the storage condenser whereby the tube can be rendered more quickly non-conductive, after extinction, to subsequent current flow therethrough upon re-establishment of positive anode potential.

Another object is to provide a storage condenser discharge pulser utilizing a gas tube connected in inverse parallel with a rectifying means to control the condenser discharge and to interrupt the action upon the completion of the first pulse, wherein the deionization of the tube can be controlled as a function of current flow therethrough by utilizing only a small portion of the total energy of the storage condenser.

Another object is to accomplish accelerated deionization of the grid controlled gas tube switch used for initiating the pulse, in a discharge pulser, by means isolating a negative charge in a separate condenser upon the firing of said switch tube, which charge is used to drive the control grid of the switch tube negative upon stoppage of current flow in the cathode-anode circuit thereof.

Other and further objects will appear as the description proceeds.

In the accompanying drawings which form a part of the instant specification and wherein like reference numerals are used in the various views to indicate like parts.

Figures 1, 4:
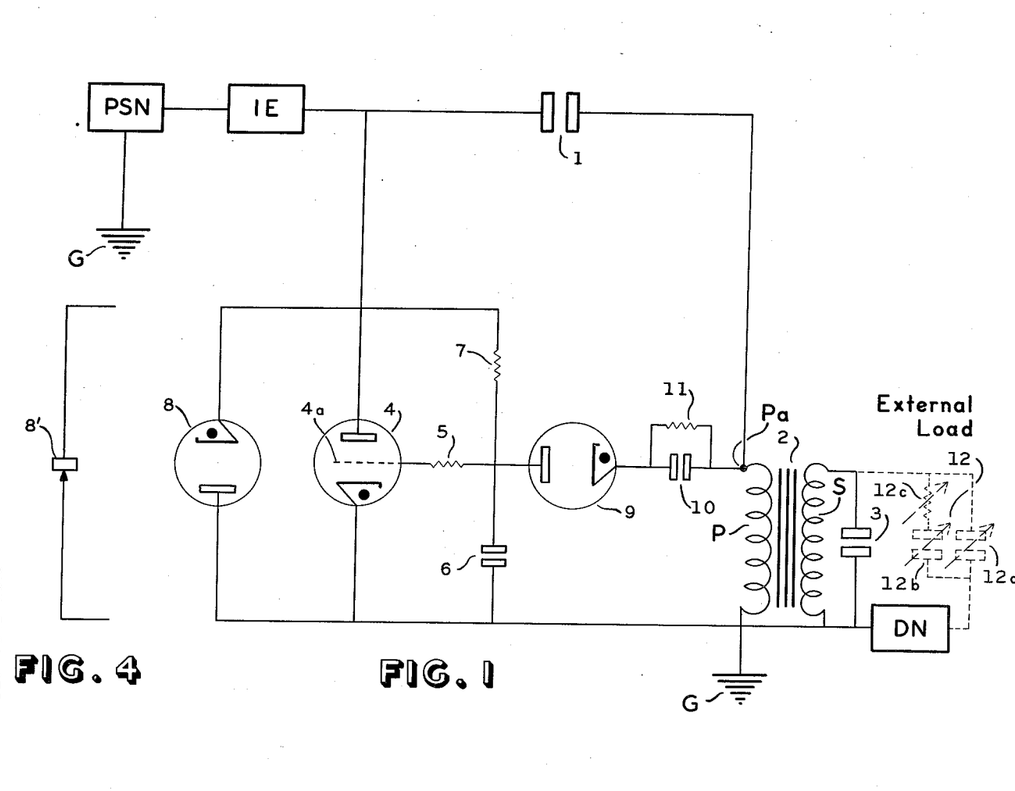
FIG. 1 is an electrical diagram illustrating one embodiment of this invention.
FIG. 4 is an electrical diagram illustrating a fragment of a circuit which may be utilized in a modification of the embodiment of FIG. 1.

Referring to FIG. 1 of the drawings, the circuit may be considered as comprised of several different components in combination. There is the source, or power supply network PSN, of intermediate high voltage low impedance direct current; the charging portion of the circuit consisting of the isolating element IE which provides a path for limited current flow from PSN to the pulser; the pulse generator or pulser including the energy storing condenser 1, the primary winding P of the load transformer 2, and a switching means including the gas-filled tube 4, and rectifier 8, arranged to intermittently discharge and recharge, respectively, the condenser 1 through the load transformer; the circuit, including gas-filled tube 9, for accelerating deionization of tube 4; and the output circuit including the capacitance 3 connected across the secondary S of the transformer 2. In order for the pulser to be practicable, i.e., of general utility, in uses involving the recovery of energy to storage condenser 1, it is necessary to include capacity, as represented by condenser 3, in the circuit as a requisite component for operation under the condition where no external load is connected to the pulser. Under the no-load condition, therefore, the pulser will operate in a stable manner to produce single pulses having uniform crest potential of a value particularly dictated by the selection of electrical values incorporated in the individual components of the circuit. This crest potential, under such operating condition, represents the no-load output voltage. The degree to which the output voltage is lowered upon connecting the pulser to an external load 12 will depend, not only upon the value of the capacitance of the external load along with its associated resistance, but also upon the regulating characteristics of the circuit as will later be explained.

The most prominent parameters of the external load 12, shown in dotted lines, encountered in pipeline holiday inspection consist of a varying capacitance 12a, shunted by a varying capacitance 12b in series with a varying resistance 12c. The load is physically represented in practice in the form of the exploring electrode and the coated pipe which are electrically connected across the capacitance 3. The electrical values of these parameters will vary considerably in operation, and it is desirable to deliver an output testing potential of substantially constant peak voltage regardless of the differences in the capacitance or loss of energy in the external load due to the varying conditions encountered.

Considering more in detail the hookup or connections of the circuit, the power supply network PSN representing the source of low impedance intermediate high voltage direct current, may include, for field operation, a low voltage storage battery and a converter of conventional construction, so that the output voltage will be intermediately high, as, for one example, 1000 volts.

The conventional charging portion of the circuit is represented by the isolating element IE which effectively separates the power supply network PSN from the discharging circuit during the period of generation of a pulse, and provides a conducting path for recharging the storage condenser 1 from the power supply network PSN during the interpulse period. The isolating element may be any arrangement providing suitable impedance or switching as will be understood by those skilled in the art.

Turning to the pulser section of the circuit, the signal controlled rectifier shown is a gas-filled grid controlled switch tube 4. It has its anode connected to one plate of the storage condenser 1 and its cathode connected to ground G, so as to provide a unidirectional switch between the condenser 1 and ground. The other plate of condenser 1 is connected to one end of primary P of the pulse transformer 2, the opposite end of the primary P being connected to ground G. The switching action of tube 4 is controlled by the grid 4a which can be rendered positive with respect to ground G to fire the tube at predetermined or selected time intervals. An RC timing arrangement is provided for interval firing of the gas tube 4, by means of the resistor 7 and condenser 6. One end of the resistor 7 has a connection to a source of intermediate high voltage D.C. or it may be connected directly to the power supply network PSN, and the other end is connected to condenser 6. The junction between the resistor 7 and condenser 6 is connected through resistor 5 to the grid 4a of tube 4. The other end of condenser 6 is connected to ground G. The energy buildup on condenser 6 will be at a rate determined by the relative values of the source of intermediate high voltage, condenser 6, and resistor 7. Therefore, when the positive potential of the charge on condenser 6 reaches a predetermined value, this potential will, of cource, be simultaneously present on grid 4a and will fire tube 4.

A rectifier means is provided which may be a gas-filled rectifier tube 8, which need be only a diode tube, and is connected in inverse parallel with the tube 4 so that the rectifier tube 8 provides a unidirectional path for current flow between the condenser 1 and ground G in a direction opposite to the unidirectional path provided by tube 4. Any suitable rectifier means may be employed which is capable of providing this unidirectional flow path under the conditions prevailing in the circuit. When the tube 4 fires, the anode of tube 4 is in effect instantaneously connected to the cathode (except for the relatively small inherent potential drop in the main gas conduction path of tube 4), and condenser 1 is thus in effect connected across the primary P of transformer 2. The end of primary P of transformer 2 connected to ground G will remain at all times, of course, at ground G, whereas the potential of the opposite end of primary P will be immediately depressed below ground G, by an amount equal to the difference between the starting potential of the storage condenser 1 and the voltage drop across tube 4. Thereupon storage condenser 1 immediately begins its discharge through the primary P of transformer 2 and switch tube 4 in series connection therewith, to provide the wave front, or first half, of an output pulse from the secondary S of transformer 2. When the current flow of this initial discharge of condenser 1 through the anode-cathode circuit of the tube 4 ceases, the tube 4 extinguishes. The extinction of gas switch tube 4 marks the end of the formation of the wave front of the output pulse by the energy flowing from the secondary S of transformer 2, into condenser 3, and the potential of the charge thus imparted into condenser 3 has reached a peak value. Instantaneously upon the acquisition of its maximum charge, condenser 3 begins to discharge back into the secondary S of transformer 2 to initiate current flow in a direction opposite to that received by condenser 3 during its charging. As the condenser 3 is being charged, the potential of point Pa of primary P of transformer 2 rises as the charge of storage condenser 1 is being depleted while the grounded end of primary P remains fixed at ground G. As condenser 3 initiates its discharge back into transformer 2, it produces a transient drop of voltage of point Pa together with the correspondingly connected plate of storage condenser 1, and thus simultaneously results in the same drop in potential of the anode of switch tube 4 and the cathode of rectifier tube 8, both of such subcomponents are directly connected to the opposite plate of storage condenser 1. The sharp character of this transient is illustrated by the spike on the curves 13 and 14 in FIG. 2. This spike is eliminated substantially when a rectifier such as diffused-junction germanium diode is used, as will be more fully explained in conjunction with the description of FIG. 4. This sudden impulse imposes a forward voltage across tube 8 causing it to fire and recharge condenser 1 to complete the last half of the pulse forming cycle. The character of the complete pulse is illustrated by curve 18 in FIG. 3. At the instant of extinction of tube 8, indicative of cessation of current flow through its plate circuit, the gas switch tube 4 will have become sufficiently deionized by means hereinbelow described, so that tube 4 will block the further discharge of storage condenser 1 until the time of the next pulse desired. The rectifier tube 8 will not support a current flow in the reverse direction, and upon the extinction of tube 8 the connection between storage condenser 1 and ground G is broken, thus disconnecting storage condenser 1 from across the primary P of transformer 2. Thus, the recovered charge in condenser 1 is retained there until the next firing of tube 4 and, therefore, cannot be dissipated in harmful oscillations. The rectifier means, such as tube 8, must be able to block this reverse potential and the somewhat higher discharge potential of condenser 1.

Figure 2:
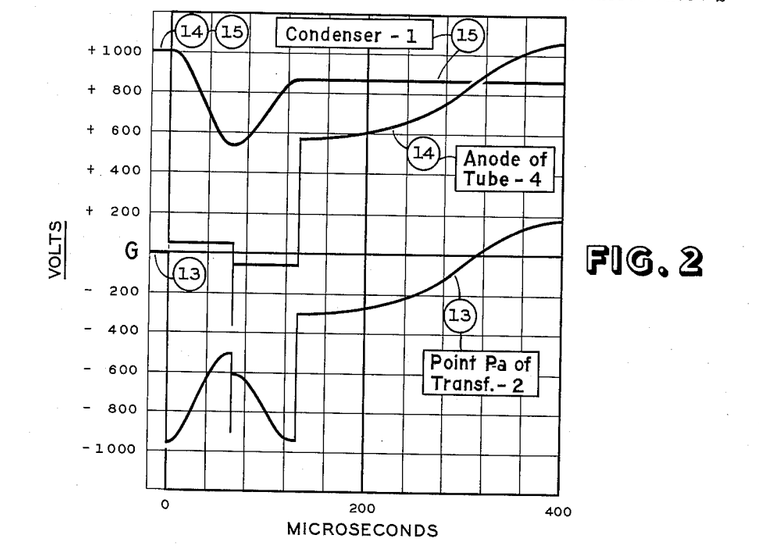
FIGS. 2 and 3 are reproductions of curves shown by oscilloscope observations made at several points in a circuit which embodied the invention of the circuit of FIG. 1, which curves illustrate the character of the voltage excursions of corresponding points within the circuit of FIG. 1.

It will be noted on curve 13 of FIG. 2 that the potential of point Pa of transformer 2 rises abruptly, upon the extinction of tube 8, to a value (in the example illustrated) of minus approximately 300 volts, and that thereafter the potential follows a path of low frequency oscillation. This relatively low frequency oscillation is a result of a portion of the energy originally contained by storage condenser 1 having been inherently taken up by the magnetic core of the transformer 2 during the pulse forming period, and accounts for part of the energy dissipation which is inescapably lost during each pulsing action. The low frequency oscillation dies out, dissipating its energy in the form of heat, before the next pulse generation, the energy content of this oscillation being in practice very small compared to the total energy discharged into the transformer. It will be noted by reference to curves 13 and 14 in FIG. 2 that the difference in potential between these curves is equal to the potential across storage condenser 1 (as indicated by curve 15) at any given instant. This means that the low frequency voltage oscillation induced by the energy temporarily absorbed by core of transformer 2, has no effect on the recovered state of charge in storage condenser 1, or upon the recharging of storage condenser 1 through the isolating element IE. Thus, condenser 1 floats on the low frequency oscillation of the dying energy of the core of transformer 2. It will be understood that upon cessation of this low frequency oscillation during the first moments of the inter-pulse period the end Pa of transformer 2 connected to storage condenser 1 will have returned to and become quiescent at the zero potential of ground G, and will remain there until the instant of initiation of the next succeeding pulse upon the firing of tube 4.

While the recovery charging of storage condenser 1 during the last half of the single pulse cannot completely restore the energy of the original charge of condenser 1, its recovery charge is sufficiently high to make it essential, within the period of time during which tube 8 is conductive, that tube 4 will have become sufficiently deionized so that its anode can block flow of current in its plate circuit at any positive potential which condenser 1 may impose thereon at the instant of termination of current flow through rectifier 8. Switching means having the control and conducting characteristics of gas-filled tubes have well recognized natural or inherent periods of deionization which vary widely, dependent upon various factors, and if this period of deionization of a given type switching means is sufficiently fast, relative to the duration and intensity of a pulse generated in a pulser in the manner above described, that it will have reached a state of deionization sufficient to block subsequent uncontrolled discharge of condenser 1 upon the cessation of current flow through rectifier 8 or 8', then no means of accelerating deionization of the switching means 4 is required. However, where the external load 12 will constitute the capacitance between the exploring electrode of a holiday detector and the coated pipeline, under moist conditions, it is desired that the output test potential be short-lived as of an order of time such that the pulse decay time, corresponding to the interval during which tube 8 is conducting, may be short as compared to the natural deionization period of a gas-filled tube 4. Therefore, if this consideration of relative time is of a border line nature, or if the last half of the duration of the desired pulse is definitely less than the natural deionization period of the tube 4, it is necessary to accelerate the deionization of tube 4 in order for the equipment to be operable.

In accordance with this invention, an accelerated deionization of the tube 4 is brought about in response to the firing of tube 4 itself and is accomplished by utilizing energy derived from the storage condenser 1 to drive the control grid 4a of tube 4 negative during the period that tube 8 is conductive. This negative charge on the grid 4a accelerates deionization of the tube 4 so that it is in condition to block the discharge of condenser 1 when the last half of the single pulse has been completed, upon the extinction of tube 8, and the charge of condenser 1 at that time suddenly reimposes a positive potential across the anode-cathode circuit of tube 4. In the embodiment shown, the grid 4a is driven negative by virtue of its connection through resistance 5 to condenser 6, the juncture of which two is in turn connected through gas-filled tube 9 and condenser 10 to the juncture of the plate of condenser 1 with the end Pa of transformer 2. The tube 9 provides, in effect, an instantaneous unidirectional switch which performs as a slave to the firing of tube 4, and fires immediately subsequent to the firing of tube 4 to impose negative charges on condensers 6 and 10, whereupon the tube 9 extinguishes. As heretofore explained, at the instant of firing of tube 4 the potential of point Pa drops from ground G to a negative potential with respect to ground G. Within the period of time required for the above action, the positive potential above ground G reached by timing condenser 6 to trigger tube 4 will remain substantially unchanged due to the blocking action of resistor 5 in the extremely short duration of time involved. As the point Pa falls to its negative potential, the potential of condenser 10, resistor 11, and the cathode of gas-filled switch tube 9 all simultaneously fall in potential along with point Pa. However, as the potential of the cathode of tube 9 thus rapidly becomes more negative with respect to ground G, with the anode of tube 9 remaining at approximately the positive potential of condenser 6 required to trigger tube 4, a potential difference across the anode-cathode circuit to tube 9 representing its firing potential is instantly reached, thus causing tube 9 to be rendered conducting. As tube 9 fires it in effect acts as a switch to connect condensers 6 and 10 and the conducting discharge paths of tubes 4 and 9 all in series connection across the storage condenser 1. Condensers 6 and 10, which are of a low order of capacitance, relative to condenser 1, are selected with relative values so as to result in the desired charge of negative polarity being placed on condenser 6 to properly bias grid 4a of tube 4 during a later time period. The entire action described above regarding the firing of tube 9 and the resultant placement of proportioned charges on condensers 6 and 10 takes place immediately subsequent to the initial firing of tube 4. Current flow time is very short, and tube 9 extinguishes immediately after its firing, it being therefore evident that a charge of negative polarity for later use in deionizing tube 4 is isolated in condenser 6 through the high speed switching action of gas tube 9. Tube 9 need be only a diode gas tube. It will be appreciated by those skilled in the art, that the circuit for accelerating deionization of tube 4 is flexible and that the charge in condenser 6, which results when tube 9 fires, may actually be varied from a charge of positive polarity with respect to ground G, but less negative than would otherwise remain in the condenser, to a charge of negative polarity of the maximum negative charge to which point Pa is driven upon firing of tube 4. Also this resulting charge upon condenser 6 influences the timing of the next subsequent firing of tube 4.

Upon the extinction of tube 9, bleeder resistance 11 serves as a means to control the discharge of condenser 10 so that, of first consideration, its charge will be completely neutralized within a time period less than the desired interpulse period. The value of resistor 11 is made sufficiently great, however, so that the potential of the cathode of tube 9 with respect to point Pa of transformer 2 will not be bled down so fast as to result in a potential difference, at any relative condition during the last half of the pulse forming period, between the anode and cathode of tube 9, sufficient to again ionize and cause unwanted second firing of tube 9 during such period.

Referring to FIG. 1, resistor 5 is placed in the connection between the grid 4a and condenser 6 in order to limit the grid electron flow, within safe limits for grid life preservation, during the conduction period of tube 4, and so that upon the extinction of tube 4 there will be a remanent negative charge on condenser 6 sufficient to properly bias the grid 4a negatively, whereupon said resistor 5 serves the further purpose of attenuating the rate of application of negative biasing voltage to grid 4a for accelerating deionization of tube 4 during the period that tube 8 is conducting.

Figure 3:
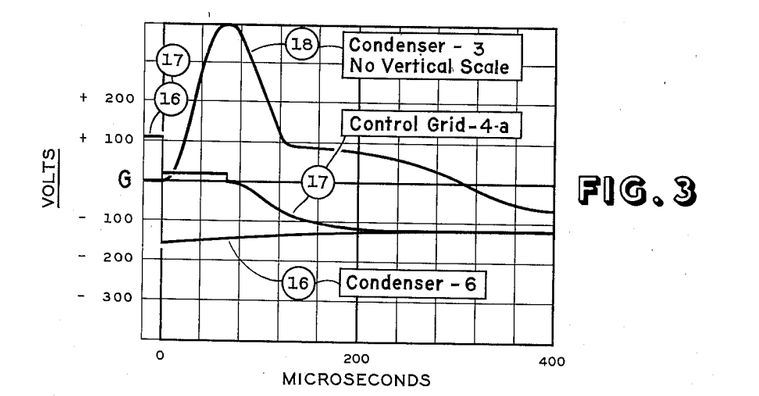

It will be appreciated that with this arrangement a single condenser 6 is utilized both in the triggering and in the accelerated deionization of tube 4. At the moment of completion of each individual single pulse generated in the pulser, condenser 6 will have a remanent negative charge and thereupon, by virtue of resistor 7 connected in series between condenser 6 and a source of intermediate high voltage, gradually has its charge reversed to a predetermined positive potential in order to provide the positive bias on grid 4a required to trigger tube 4 for generation of the next succeeding output pulse. Thus, the means for accelerating deionization of the tube 4 may constitute a part of the pulse repetition rate timing means for the circuit. The relative voltage excursions of grid 4a and condenser 6 are illustrated in FIG. 3 by the curves 17 and 16, respectively. It is seen that condenser 6 is immediately rendered negative upon firing of tube 4 and rises gradually until its merger with curve 17 subsequent to extinction of tube 8. Upon extinction of tube 4, its grid voltage falls abruptly to ground G and then curves downwardly, indicating the progress of deionization of the tube. At the time of extinction of tube 8, the negative bias of grid 4a has commenced leveling off indicating the further state of deionization reached by tube 4, which through design is made sufficient to block the positive potential imposed at that instant upon the anode of tube 4 as shown by curve 14.

Care must be taken to not drive grid 4a to an excessively negative value due to the likelihood in such event of causing the tube 4 to fire in a spurious manner upon reimposing substantial anode positive voltage thereon. The effectiveness of this control method for accelerating deionization is evidenced by the fact that by use of circuitry employing the components of FIG. 1, the gas-filled tube 4 has been successfully deionized within only a small fraction of the deionization time required where no negative biasing potential is applied to control grid 4a. Furthermore, with an understanding of the foregoing principles, it will be appreciated that this grid control can be used with equally effective adaptation to the general class of gas-filled discharge tubes which are designed to have negative grid control characteristics, where it is mandatory that the grid be operated, during use, in a region which is continuously negative to a varying degree with respect to cathode potential. Also, where it may be desired for convenience in a particular circuit design, the grid of tube 4 can be driven negative through the action of tube 9 and condenser 10, by a series connection of these latter components to any point on primary P of transformer 2 or to either plate of condenser 1, providing a proper arrangement of bleeder resistor 11 is made. Such other practical circuit arrangements embodying the principles of this invention would include variations as for example:

(1) The RC combination of components 10 and 11 may be interchanged in position with tube 9, (2) In the above variation (1) the cathode of tube 9 may be connected to any point on the primary P of transformer 2 where the potential at that point will be sufficient to fire tube 9, (3) In the sequential arrangement of tube 9 with the RC components 10 and 11 as shown in FIG. 1 of the drawing, the condenser 10 and the resistor 11 may be connected to any point, or individually to different points, on the primary P of transformer 2; provided that the potential of the point to which condenser 10 is connected to the primary P will be sufficient to fire tube 9, (4) In the sequential arrangement of tube 9 with the RC components 10 and 11 as shown in FIG. 1 of the drawing, the condenser 10 may be connected from the cathode of tube 9 to the side of condenser 1 which is fed by the isolating element IE; provided that the bleeder resistor 11 is connected from the cathode of tube 9 to the opposite side of condenser 1 or to any point between said opposite side of condenser 1 and ground G, (5) The RC combination of components 10 and 11 may be completely eliminated from the circuit, and the cathode of tube 9 in such case may then be connected to any point between the transformer side of condenser 1 and ground G, provided that the resulting potential across tube 9 is sufficient to fire tube 9.

It will be understood to those skilled in the art that a separate winding on the core of transformer 2 may be used as a biasing source in lieu of primary P in any of the above exemplary connections, and in other practical arrangements.

The characteristic of long life may be the prevailing influence in deciding upon a choice of particular tubes for adapting the principles of the circuit to a given application, but for attainment of the highest over-all operating efficiency and readiness to perform in such application, the cold cathode tube is preferable because it does not require current from the primary energy source for cathode heating, and is also instantly usable; whereas thermionic gas-filled tubes require cathode heater energy of several watts for each tube, and a delaying warm-up period is necessary before placing such tubes in operation. Thermionic tubes may be employed, as will be understood by those skilled in the art, where the energy requirements for the heaters, and the delay period, are not objectionable. It will be understood that in a particular application to use, the gas-filled discharge tubes numbered 4, 8 and 9 must be capable of properly blocking the forward and inverse voltages encountered across the anode-cathode tube circuits, and that they must also have forward break-down characteristics such as to render them capable of being fired in chronological sequence at predetermined instants by the ionizing potential existing at these instants under the conditions of such application to use.

Holiday detector network DN of FIG. 1, such as shown in United States Patent No. 2,594,595, is connected across output condenser 3, in series with the external load 12 representing the high voltage inspection circuit, for the purpose of bringing about audible and visual alarm signals or other responsive action, in the event of formation of either a spark or short circuit, between the exploring electrode and the pipe upon encountering a fault (viz., holiday) in the protective coating thereon.

Considering now, in more detail, the load circuit of the generator as used in the formation of high voltage pulses, the turns ratio that the secondary S bears to the primary P in transformer 2 is such as to give a step-up in voltage, and the transformer 2 preferably is designed in accordance with the teaching of United States Letters Patent No. 2,594,595 to provide a leakage reactance between the secondary S and the primary P of transformer 2. The larger this leakage reactance, the longer the time of the single pulse generated; and the smaller this reactance, the shorter the time of the single pulse generated. Thus, the relationship of condensers 1 and 3 and the leakage reactance of the load transformer 2 are the principal parameters that determine the duration of the single pulse generated.

The circuit is one which lends itself admirably to the delivery of a well regulated output voltage, throughout a wide range of varying capacitances of the external load. This means that in holiday detection operations the voltage impressed across the insulating coating will tend to remain near the level of no-load operation even though the capacitance of the external load is relatively large, as for example, that encountered when testing the insulating coating upon large diameter pipes of the order of 30″ which are common. It has been found that in the instant pulser, for holiday detector use, the capacitance of the condenser 3 is preferably made small, as for example, of the order of 0.0005 mfd. in producing an output voltage of the order of 15,000 volts, in order to minimize the amount of energy transfer necessary to flow to and from it during a pulsing action. As compared to the above cited capacitive value of 0.0005 mfd. for condenser 3, 0.0015 mfd. is representative of the external load capacitance encountered when inspecting a 30″ coated pipe.

One of the major values of this circuit lies in the fact that there is no circuit limitation as to the maximum value usable for condenser 1. The larger the capacitance of condenser 1, the more nearly constant the output voltage will remain. Of course, the particular use to which the circuit is to be put will in many instances dictate limitations in the total capacitance of the condenser 1. For example, in holiday detection in the field, the safety factor to the operator must be considered and it is recommended that condenser 1 not be greater than about 2 mfd. under the exemplary conditions set out in the next preceding paragraph and where the PSN is operated near the 1000 v. D.C. level. The fact that the energy of condenser 1 is not completely dissipated upon each pulsing action, for the first time makes such a large value of capacitance for condenser 1 economically feasible for field use. In way of summary, for any given transformer the greater the capacitance of condenser 1 relative to the total capacitance across the transformer secondary, the better the output voltage regulation. In any case, for good regulation, the capacitance of condenser 1 should be a very large value compared to the product of the square of the transformer turns ratio multiplied by the sum of the maximum expected capacity of the external load and the capacity of condenser 3 so that the quotient of the value of the capacity of condenser 1 divided by such product plus the value of condenser 1, closely approaches unity.

In FIG. 4 the rectifier symbol 8′ illustrates generically the use of a rectifier means and is to be considered as 8. In each instance, the rectifier is shown arranged inversely to the switch tube 4. In other words, speaking in sense of electron flow, rectifier 8′ is arranged to permit flow of electrons from condenser 1 to ground G, but not inversely.

The rectifier may be any suitable component capable of blocking current flow in the direction controlled by substituted in the FIG. 1 diagram for the rectifier tube the switch tube and of passing the current in the opposite direction, under the operating conditions of the circuit. In addition to the gas-filled tubes discussed above, certain semi-conductor type rectifiers may be employed. If using the semi-conductor type rectifier in a holiday detector, since the current flow or amperage reaches a rather high rate at its peak, it is desirable to use a diffused-junction diode. The germanium rectifier, of this type, has been found, in many respects, to be even better suited for service in holiday detectors than the gas-filled diode tube 8. They are less expensive because longer lived, and actually have a lesser voltage drop across them when conducting, than do the gas-filled tubes. Even more important, it has been found that the switch tube 4 performs much longer where the rectifier is of the semi-conductor type instead of the gas-filled tube. A possible explanation of this unexpected result is advanced below in connection with the curves 13 and 14.

As indicated previously, where the rectifier means 8′ is of the semi-conductor type, they do not require a relatively high forward breakdown voltage, as does the gas-filled tube. The vertical spikes on curves 13 and 14 at the time the rectifier means 8′ initiates current flow, are therefore very, very small. Also, the steps at the mid-pulse point on these curves is much less pronounced because the voltage drop across this type rectifier is materially less than that across the gas-filled tube.

The substantial elimination of the spike at the mid-pulse point on curves 13 and 14 is believed to be of great significance as an explanation of the increased useful life of the switch tube. It means that the switch tube 4 is not subjected to a high inverse voltage just after its period of conducting flow. Apparently this increased life of the switch tube is due to a minimization of gas clean-up in the tube, which is accelerated where the tube is subjected to the high inverse voltage, as where the rectifier is a gas-filled tube 8.

From all of the foregoing considerations of the two embodiments of the invention, it will be understood that the generating circuit herein disclosed has great flexibility in the formation of voltage pulses, and that a well regulated output voltage is produced by the pulser over a wide range and types of loads, under the condition where an adequately regulated power supply network PSN is used therewith. The time duration, voltage intensity, output voltage regulation, and repetition rate of the pulses can be varied over wide ranges in predictable manner as determined by the circuit parameters selected for particular applications.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A high voltage, short duration pulse generator for holiday inspection of insulating coatings comprising an energy storing condenser; a load circuit including a transformer with its primary connected to receive energy from the condenser and a secondary having leakage reactance to the primary, and a capacity load across the secondary; a rectifier providing a path for current flowing in one direction between the condenser and the load; means including a grid controlled gas tube for discharging the condenser through the primary and providing a unidirectional current path in the opposite direction to that of the rectifier, means for deionizing the grid controlled gas tube, during the interval that the rectifier is conducting, to an extent to render the grid controlled gas tube nonconductive; and timing means to trigger the grid controlled tube at predetermined time intervals.

2. The pulse generator of claim 1 wherein the rectifier is a germanium rectifier.

3. A high voltage, pulse generator comprising an energy storing condenser; a load circuit including a transformer with its primary connected to receive energy from the condenser and a secondary having leakage reactance to the primary, and a capacitor across the secondary providing an internal load; the capacity of the condenser being a very large value relative to the product of the square of the turns ratio of the transformer multiplied by the sum of the capacitance of an expected external load plus that of the capacitor, whereby to provide a well regulated output voltage throughout a range of varying capacity external loads; a rectifier providing a path for current flowing in one direction between the condenser and the load; means including a grid controlled gas tube for discharging the condenser through the primary and providing a unidirectional current path in the opposite direction to that of the rectifier.

4. A high voltage, short duration pulse generator for holiday inspection of insulating coatings comprising an energy storing condenser; a load circuit including a transformer with its primary connected to receive energy from the condenser and a secondary having leakage reactance to the primary, and a capacity load across the secondary; a rectifier providing a path for current flowing in one direction between the condenser and the load; means including a grid controlled gas tube for discharging the condenser through the primary and providing a unidirectional current path in the opposite direction to that of the rectifier, the relationship of the capacity of the energy storing condenser, the inductive reactance of the transformer, and the total capacity across the secondary, being such that the duration of the decay of the pulse generated by the discharge of said condenser is substantially equal to or less than the inherent period of deionization of the grid controlled tube; means for accelerating deionization of the grid controlled tube responsive to current flow through the plate circuit of the tube, to drive the grid negative by energy derived from the condenser, said latter means including energy storing means to provide an electron flow to the grid during the period of current flow in the rectifier; and timing means to trigger the grid controlled tube at predetermined time intervals.

5. The high voltage pulse generator of claim 4 wherein the energy storing means for deionizing the grid controlled tube includes a condenser and an impedance with the condenser connected to the control grid through the impedance whereby current flow in the grid circuit is substantially blocked while the tube is conductive.

6. A high voltage, short duration pulse generator for holiday inspection of insulating coatings comprising an energy storing condenser; a load circuit including a transformer with its primary connected to receive energy from the condenser and a secondary having leakage reactance to the primary, and a capacity load across the secondary; a rectifier providing a path for current flowing in one direction between the condenser and the load; means including a grid controlled gas tube for discharging the condenser through the primary and providing a unidirectional current path in the opposite direction to that of the rectifier, the relationship of the capacity of the energy storing condenser, the inductive reactance of the transformer, and the total capacity across the secondary, being such that the duration of the decay of the pulse generated by the discharge of said condenser is substantially equal to or less than the inherent period of deionization of the grid controlled tube; means for accelerating deionization of the grid controlled tube comprising two condensers in series, one condenser connected through an impedance to the grid of the grid controlled tube, and a rectifier in circuit with the condensers adapted to supply a negative charge from the energy storing condenser to the condenser connected to the grid, upon flow of current in the plate circuit of the grid controlled tube, and to block the discharge therethrough of the condenser connected to the grid; and timing means to trigger the grid controlled tube at predetermined time intervals.

7. The high voltage pulse generator of claim 6 wherein the rectifier of the grid deionization circuit is a gas tube rectifier.

8. A substantially constant voltage pulser circuit for use with capacitive loads of varying magnitude in holiday inspection of insulating coatings, said circuit comprising a source of low impedance direct current, an energy storing condenser, means including an isolating element connecting the current source to the condenser for charging same; a load circuit including a step-up transformer with primary and secondary windings, a capacitor across the secondary, said capacitor adapted to be connected across a varying capacity external load, the primary winding being connected to receive energy from the condenser; a rectifier providing a path for current flowing in one direction between the condenser and the load; means including a grid controlled gas tube for discharging the condenser through the primary and providing a unidirectional current path in the opposite direction to that of the rectifier; and timing means to trigger the grid controlled tube at predetermined time intervals.

9. A substantially constant voltage pulser circuit for use with capacitive loads of varying magnitude in holiday inspection of insulating coatings, said circuit comprising a source of low impedance direct current, an energy storing condenser, means including an isolating element connecting the current source to the condenser for charging same; a load circuit including a step-up transformer with primary and secondary windings, a capacitor across the secondary, said capacitor adapted to be connected across a varying capacity external load, the primary winding being connected to receive energy from the condenser; the capacity of the condenser being a very large value, relative to the product of the square of the turns ratio of the transformer multiplied by the sum of the maximum capacitance of an expected external load plus that of the capacitor, whereby to provide a well regulated output voltage throughout a range of varying capacity external loads; a gas rectifier providing a path for current flowing in one direction between the condenser and the load; means including a grid controlled gas tube for discharging the condenser through the primary and providing a unidirectional current path in the opposite direction to that of the rectifier; and timing means to trigger the grid controlled tube at predetermined time intervals.

10. A substantially constant voltage pulser circuit for use with capacitive loads of varying magnitude in holiday inspection of insulating coatings, said circuit comprising a source of low impedance direct current, an energy storing condenser, means including an isolating element connecting the current source to the condenser for charging same; a load circuit including a step-up transformer with primary and secondary windings, a capacitor across the secondary, said capacitor adapted to be connected across a varying capacity external load, the primary winding being connected to receive energy from the condenser; the capacity of the condenser being a very large value, relative to the product of the square of the turns ratio of the transformer multiplied by the sum of the maximum capacitance of an expected external load plus that of the capacitor, whereby to provide a well regulated output voltage throughout a range of varying capacity external loads; a rectifier providing a path for current flowing in one direction between the condenser and the load; means including a grid controlled gas tube for discharging the condenser through the primary and providing a unidirectional current path in the opposite direction to that of the rectifier, means for deionizing the tube, to an extent to render it nonconductive, during the interval that the rectifier is conducting; and timing means to trigger the grid controlled tube at predetermined time intervals.

11. A substantially constant voltage pulser circuit for use with capacitive loads of varying magnitude in holiday inspection of insulating coatings, said circuit comprising a source of low impedance direct current, an energy storing condenser, means including an isolating element connecting the current source to the condenser for charging same; a load circuit including a step-up transformer with primary and secondary windings, a capacitor across the secondary, said capacitor adapted to be connected across a varying capacity external load, the primary winding being connected to receive energy from the condenser; a rectifier providing a path for current flowing in one direction between the condenser and the load; means including a grid controlled gas tube for discharging the condenser through the primary and providing a unidirectional current path in the opposite direction to that of the rectifier, means for deionizing the tube, to an extent to render it nonconductive, during the interval that the rectifier is conducting; and timing means to trigger the grid controlled tube at predetermined time intervals.

12. A substantially constant voltage pulser circuit for use with capacitive loads of varying magnitude in holiday inspection of insulating coatings, said circuit comprising a source of low impedance direct current, an energy storing condenser, means including an isolating element connecting the current source to the condenser for charging same; a load circuit including a step-up transformer with primary and secondary windings, a capacitor across the secondary, said capacitor adapted to be connected across a varying capacity external load, the primary winding being connected to receive energy from the condenser; a rectifier providing a path for current flowing in one direction between the condenser and the load; means including a grid controlled gas tube for discharging the condenser through the primary and providing a unidirectional current path in the opposite direction to that of the rectifier; the relationship of the capacity of the energy storing condenser, the inductive reactance of the transformer, and the total capacity across the secondary, being such that the duration of the decay of the pulse generated by the discharge of said condenser is substantially equal to or less than the inherent period of deionization of the grid controlled tube; means for accelerating deionization of the grid controlled tube responsive to current flow through the plate circuit of the tube, to drive the grid negative by energy derived from the condenser, said latter means including energy storing means to provide an electron flow to the grid during the period of current flow in the rectifier; and timing means to trigger the grid controlled tube at predetermined time intervals.

13. The pulser circuit of claim 12 wherein the grid controlled tube is a cold-cathode tube and the energy storing means for deionizing the grid controlled tube includes a condenser and an impedance, the condenser being connected to the control grid through the impedance, whereby current flow in the grid circuit is substantially blocked while the tube is conductive.

14. A substantially constant voltage pulser circuit for use with capacitive loads of varying magnitude in holiday inspection of insulating coatings, said circuit comprising a source of low impedance direct current, an energy storing condenser, means including an isolating element connecting the current source to the condenser for charging same; a load circuit including a step-up transformer with primary and secondary windings, a capacitor across the secondary, said capacitor adapted to be connected across a varying capacity external load, the primary connected to receive energy from the condenser; a rectifier providing a path for current flowing in one direction between the condenser and the load; means including a grid controlled gas tube for discharging the condenser through the primary and providing a unidirectional current path in the opposite direction to that of the rectifier; the relationship of the capacity of the energy storing condenser, the inductive reactance of the transformer, and the total capacity across the secondary, being such that the duration of the decay of the pulse generated by the discharge of said condenser is substantially equal to or less than the inherent period of deionization of the grid controlled tube; means for accelerating deionization of the grid controlled tube comprising a condenser electrically connected to the circuit containing the energy storing condenser and load transformer to receive a negative charge from the energy storing condenser, and connected through an impedance to the grid of the grid controlled tube, and a rectifier in circuit between the condenser and its said connection to the energy storing condenser circuit and adapted to supply the negative charge to the condenser upon flow of current in the plate circuit of the grid controlled tube and to block the discharge through it of the condenser connected to the grid; and timing means to trigger the grid controlled tube at predetermined time intervals.

15. The pulser circuit of claim 14 wherein the rectifier of the grid deionization circuit is a gas tube rectifier and the timing means includes the condenser of the deionization circuit.

16. A high voltage pulse generator comprising:
an energy storing condenser;
a load circuit including a transformer having its primary connected to receive energy from the condenser, and a capacitive load across the secondary of the transformer;
the capacitance of the condenser being very large relative to the product of the square of the turns ratio of the transformer multiplied by the capacitance of the capacitive load, whereby to provide a well regulated output voltage throughout a range of different capacitances of the capacitive load;
a rectifier providing a path for current flow in one direction between the condenser and load;
means including an electronic switch rectifier having a control element connected to normally bias the electronic switch rectifier to a non-conducting condition, said electronic switch rectifier being of the character rendered conductive by a signal applied to the control element and remaining conductive after cessation of the signal for discharging the condenser through the primary and providing a unidirectional current path in the opposite direction to that of the rectifier.

17. A voltage pulser circuit comprising:
an energy storing condenser;
a load circuit including a transformer having primary and secondary windings, the primary winding being connected to receive energy from the condenser, and a capacitive load across the secondary winding;

a rectifier electrically connected to provide a path for current flow in one direction between the condenser and the load circuit;

means including an electronic switch rectifier having a control element connected to normally bias the electronic switch rectifier to a non-conducting condition, said electronic switch rectifier being of the character which is rendered conductive by a signal applied to the control element and which remains conductive after cessation of the signal and then upon cessation of current flow therethrough for a period of time, becomes non-conductive, said electronic switch rectifier being connected for discharging the condenser through the primary winding and providing a unidirectional current path in the opposite direction to that of the rectifier;

the relationship of the capacitance of the energy storing condenser, the inductive reactance of the transformer and the capacitance of the capacitive load across the secondary being such that the duration of the decay of the pulse generated during the discharge of said condenser is greater than said period of time for said electronic switch rectifier to become non-conductive after cessation of current flow therethrough; and timing means for periodically triggering the electronic switch rectifier.

18. A substantially constant voltage pulser circuit for use in holiday inspection of insulating coatings comprising:

a source of direct current;

an energy storing condenser connected to the source so as to charge said condenser;

a load circuit including a transformer with a primary and a secondary, a capacitive load across the secondary, the primary being electrically connected to receive energy from the condenser;

a rectifier providing a path for current flow in one direction between the condenser and load;

means including an electronic switch rectifier having a control element connected to normally bias the electronic switch rectifier to a non-conducting condition, said electronic switch rectifier being of the character which is rendered conductive by a signal applied to the control element and which remains conductive after cessation of the signal and then upon cessation of current flow therethrough for a period of time, becomes non-conductive, said electronic switch rectifier being connected for discharging the condenser through the primary winding and providing a unidirectional current path in the opposite direction to that of the rectifier;

the capacitance of the condenser being of a very large value relative to the product of the square of the turns ratio of the transformer multiplied by the capacitance of the capacitive load, whereby to provide a well regulated output voltage throughout a range of different capacitances of the capacitive load;

the relationship of the capacitance of the condenser, the inductive reactance of the transformer and the capacitance of the capacitive load across the secondary being such that the duration of the decay of the pulse generated during the discharge of said condenser is greater than said period of time for said electronic switch rectifier to become non-conductive after cessation of current flow therethrough;

and timing means for periodically triggering the electronic switch rectifier.

No references cited.